(12) United States Patent
Carll et al.

(10) Patent No.: US 9,045,277 B1
(45) Date of Patent: Jun. 2, 2015

(54) BIODEGRADABLE MICROWAVABLE CONTAINER

(71) Applicants: D. R. Carll, Atlanta, GA (US); Dennis Corbett, Ocala, FL (US)

(72) Inventors: D. R. Carll, Atlanta, GA (US); Dennis Corbett, Ocala, FL (US)

( * ) Notice: Subject to any disclaimer, the term of this patent is extended or adjusted under 35 U.S.C. 154(b) by 0 days.

(21) Appl. No.: 13/858,456

(22) Filed: Apr. 8, 2013

Related U.S. Application Data

(63) Continuation of application No. 12/696,263, filed on Jan. 29, 2010, now Pat. No. 8,466,396.

(51) Int. Cl.
*H05B 6/80* (2006.01)
*B65D 81/34* (2006.01)

(52) U.S. Cl.
CPC .................................. *B65D 81/3453* (2013.01)

(58) Field of Classification Search
CPC .................................................. B65D 81/3453
USPC ......................................................... 219/734
See application file for complete search history.

(56) References Cited

U.S. PATENT DOCUMENTS

| 6,200,404 B1 * | 3/2001 | Andersen et al. ............. 156/245 |
| 2006/0186014 A1 * | 8/2006 | Ramanujam et al. ......... 206/508 |
| 2007/0158339 A1 * | 7/2007 | Beckman ...................... 219/734 |

FOREIGN PATENT DOCUMENTS

JP          2002-12258      *    1/2002

* cited by examiner

*Primary Examiner* — A. Sefer
(74) *Attorney, Agent, or Firm* — Patents on Demand P.A.; Brian K. Buchheit; Scott M. Garrett (57) ABSTRACT

A microwavable container comprising a top cover, a middle pan having at least one hole, and a bottom basin. The top cover, the middle pan, and the bottom basin are biodegradable being formed from a processed and shaped Monocotylendon plant of the Poales order. The top cover fits on top of the middle pan, wherein the middle pan fits on top of the bottom basin. The middle pan is designed so that fatty meats are positioned on top of the middle pan and below the top cover during microwave operations for cooking the fatty meats. During microwave operations, the top cover prevents spatter from the fatty meats being cooked from gathering on an interior of a microwave. During microwave operations, the bottom basin catches liquid residue from the fatty meats being cooked. The liquid residue drips through the one or more holes of the middle pan.

22 Claims, 5 Drawing Sheets

Biodegradable container Lifecycle 100

FIG. 6A – TOP VIEW OF BOTTOM BASIN (500)

FIG. 6B – SIDE VIEW OF BOTTOM BASIN (500)

BOTTOM BASIN

FIG. 5A – TOP VIEW OF MIDDLE PAN (400)

FIG. 5B – SIDE VIEW OF MIDDLE PAN (400)

MIDDLE PAN

FIG. 4A – TOP VIEW OF TOP COVER (300)

FIG. 4B – SIDE VIEW OF TOP COVER (300)

TOP COVER

FIG. 7A – BOTTOM VIEW OF TOP COVER (300)

FIG. 7B – SECTION THRU TOP COVER (300)

TOP COVER

FIG. 8A – BOTTOM VIEW OF MIDDLE PAN (400)

FIG. 8B – SECTION THRU MIDDLE PAN (400)

MIDDLE PAN

FIG. 9A – BOTTOM VIEW OF BOTTOM BASIN (500)

FIG. 9B – SECTION THRU BOTTOM BASIN (500)

BOTTOM BASIN

BIODEGRADABLE MICROWAVABLE CONTAINER

CROSS-REFERENCE TO RELATED APPLICATIONS

This continuation application claims the benefit of U.S. patent application Ser. No. 12/696,263 filed Jan. 29, 2010 entitled "DISPOSABLE CONTAINER FOR PACKAGING, DISPLAY, HANDING, AND COOKING OF FOOD ARTICLE." The entire contents of U.S. application Ser. No. 12/696,263 are incorporated by reference herein.

BACKGROUND

The present disclosure relates to microwavable containers and, more particularly, to a biodegradable microwavable container.

Conventional cooking generally involves handling of foods with utensils or by hand. Such handling introduces the risk of contamination transfer between the handling means and the food, or other loss such as the accidental dropping of food on an unclean surface, e.g., floor. In the case of bacon and similar fatty foods, e.g., sausage links and patties, hamburgers, hot dogs, etc., cooking gives off liquid such as grease and often results in splattering of the liquid onto nearby surfaces. In addition, the food generally remains in contact with the grease, resulting in a higher than desirable fat content and less than desirable, palatability and presentation. Conventional cooking also exposes the preparer to potential hazards associated with the handling of the cooked foods such as burning from the released hot grease and liquids and steam.

One improvement in cooking foods, such as bacon, has been by preparing foods in microwave ovens. A common practice in cooking bacon in microwave ovens is to place the bacon strips between paper towels on a paper plate or microwave-safe sheet during cooking so that the paper towels will contain and absorb the grease. This method, however, is time consuming and messy to use, requiring cleanup and disposal of grease-soaked paper towels. Other devices and methods have been introduced to try to manage the liquids produced from cooking bacon in microwave ovens however they do not provide the level of protection against grease splatter, introduction of grease into sewers or septic systems, or convenience of use and environmentally conscience disposal. In addition, prior devices are not suitably designed for cooking or inclusive of a comprehensive approach to solving issues like packaging, shipping, displaying, cooking and biodegradable environmentally conscience disposable incorporated into one device. In addition, the prior art devices do not include a means for cooking other food articles such as vegetables.

Various microwave oven bacon cooker devices are disclosed for holding and otherwise aiding the cooking of bacon, including U.S. Pat. Nos. 4,214,515; 6,211,502; 7,259,360; 7,345,263; and U.S. Pat. Appl. Pub. 2008/0110353. Of these, U.S. Pat. No. 4,214,515 to Kubiatowicz provides a structure for cooking bacon in a microwave oven. The patent describes a structure useful for moving grease away from bacon during cooking; however, the structure does not prevent upward splattering of bacon grease. In addition the structure has little utility for packaging and displaying foods, and does not prevent food from being handled and is not biodegradable for environmentally friendly disposable.

Similarly, U.S. Pat. Nos. 6,211,502 and 7,345,263 to Hechler provide a means for preventing bacon grease from splattering during cooking by providing a closed container in which to cook, but it does not allow for packaging and display of bacon or other foods for promotion and sale. Additionally, the disclosed cooker is not disposable and requires cleaning after use. Likewise, grease from the cooked bacon may be introduced into sewers and septic tanks.

U.S. Pat. No. 7,259,360 and U.S. Pat. Appl. Pub. 2008/0110353 to Sholders and Sims, respectively each disclose a tent-like structure for holding bacon during cooking thereby enabling bacon grease to drain down the sides of the tent into a box-shaped receptacle. Neither of the aforementioned disclosures shows a method or apparatus which prevents grease splatter to nearby surfaces during cooking of the bacon; nor does either provide a means for keeping the bacon from curling while being cooked. Furthermore, there is a risk of contamination exchange between the food and the preparer due to handling of the cooking apparatuses or bacon. Lastly, neither apparatus is useful for the preparation of vegetables and the like.

Accordingly, the need remains for a versatile microwavable cooking apparatus which is economical, safe, environmentally conscience and is useful to commercial entities and consumers alike.

DETAILED DESCRIPTION

The disclosure details a microwavable container that is biodegradable. Embodiments of the invention form the microwavable container, or portions thereof, using a grass or grass-like plant, which has been processed, molded, and/or formed into a microwavable container.

In one embodiment, the microwavable container can have multiple sections, such as a top, middle section (e.g., middle pan), and a catch basin (e.g., bottom basin). This arrangement permits fatty meats (such as bacon, sausage, hot dogs, etc.). to be cooked in a microwave, with the top functioning as a "splatter guard", the middle as a cooking surface—with meat browning enhancements in one embodiment—and a bottom functioning as a catch basin for grease. These three sections may be removable from each other in one embodiment. In another embodiment, the three sections can be integrated and formed from a single continuous surface material, which may be hinged. In other embodiments, a two section arrangement (a top and cooking surface, for example—or a cooking surface and catch basin) is contemplated. Thus, in contemplated embodiments, the microwavable container may be an apparatus for cooking bacon, sausage and the like, and vegetables and other like foods in a microwave oven. The apparatus may be generally useful in packaging, shipping and displaying foods, while also being biodegradable for environmentally-conscience disposal. For example, frozen, microwavable meals can be packaged and marketed inside the container detailed herein.

In various embodiments, different grass or grass-like plant are contemplated, which include but are not limited to Monocotylendons, such as plants classified in the Poales order. Specific embodiments utilize plant families that include the Poaceae family, the Cyperaceae family, and the Juncaceae family—although plants from the Anarthriaceas, Bromeliaceae, Centrolepidaceae, Ecdeiocoleaceae, Eriocalulaceae, Flagellariaceae, Joinvilleaceae, Mayacaceae, Rapateaceae, Restionaceae, Thurniaceae, Typhaceae, and Xyridaceae families are to be considered within scope of this disclosure. In even more specific embodiments, which the disclosure is not limited to, plants from the *Saccharum* genus can be utilized. Sugarcane, for example, is a plant from the *Saccharum* genus able to be utilized herein. It is advantageous to select plants that are easily able to be formed into a container shape, which are non-toxic to humans, which do not generate harmful vapors when subjected to microwave radiation (using durations and frequencies typical for food preparation), which do not break down quickly (in embodiments where the container is to be reusable . . . in other situations where the container is to be for a single use, plants that break down more quickly can be advantageous), which are "non-stick" in that food can be directly placed on the surface of the processed material and easily removed after being microwaved, and the like. Combinations of these properties can also be advantageous. For example, a surface, upon which food sits, can be made of a non-stick type of grass, while other portions of a container (such as a lid) can be made from different types of grasses, as the non-stick properties may not be of substantial concern. Cost, manufacturing ease, shipping durability, availability, and the like are also factors that are considered when selecting a specific Monocotylendon to utilize.

The disclosure considers many different embodiments, all of which are to be considered within scope of the claimed innovation—when interpreting the claims in their broadest reasonable manner in light of the specification.

In one embodiment of the disclosure, a novel apparatus is provided for packaging food articles, especially bacon, sausage, and other fatty meats, whereby the packaging itself can be used to pack, ship, display food articles on store shelves, cook the encased food in a microwave oven, and dispose of the used apparatus and food wastes allowing for a comprehensive approach to solving issues like packaging, shipping cooking and biodegradable environmentally conscience deposable while eliminating the problems associated with conventional apparatus and conventional methods for cooking such foods.

In one embodiment, an apparatus is provided for cooking bacon or the like in a microwave oven while preventing the mess associated with conventional apparatuses and methods for cooking such foods.

In another embodiment, a method is provided for cooking bacon or the like in a microwave oven which reduces the risk of injury from hot grease contact which is commonly associated with conventional apparatus and methods for cooking such foods.

In one embodiment, a microwavable food article package is provided, which is simple in construction, inexpensive to manufacture, convenient to use, disposable, raw materials are available, and eco-friendly, i.e., biodegradable.

One embodiment of the disclosure maintains a desirable presentation and improves palatability of packaged bacon after cooking.

One embodiment of the disclosure provides a singular package and cooking apparatus for a food article, especially bacon, that reduces cross-contamination by eliminating or minimizing the need to handle the food article during preparation and cooking. As an example of minimize food handling, such as a handling of bacon, a device may be used more than once, such as a purchased device including 18 slices of bacon, where a user may desire to cook the bacon six (6) slices at a time before disposing the device. In such an instance, the container minimizes but does not eliminate a need to handle the food article (i.e., bacon).

One embodiment of the disclosure provides an unpackaged (i.e., without a food article encased) microwave oven cooking apparatus with the aforementioned benefits for institutional, consumer, or other like use.

It should be understood that these embodiments do not attempt to enumerate all aspects, benefits, and features of the present disclosure. Instead, they provide substantial information to detail to one of ordinary skill the meets and bounds of the contemplated innovations. Derivatives and alternatives evident to one of ordinary skill upon reading the disclosure are to be considered within scope of this disclosure. For example, the apparatus of the present disclosure may be configured in any shape, including, but not limited to, rectangular, square, circular, hexagonal, etc. Indeed, the inventor contemplates that the invention includes all apparatuses and methods that can be practiced from all suitable combinations of the disclosure.

Figure 1:
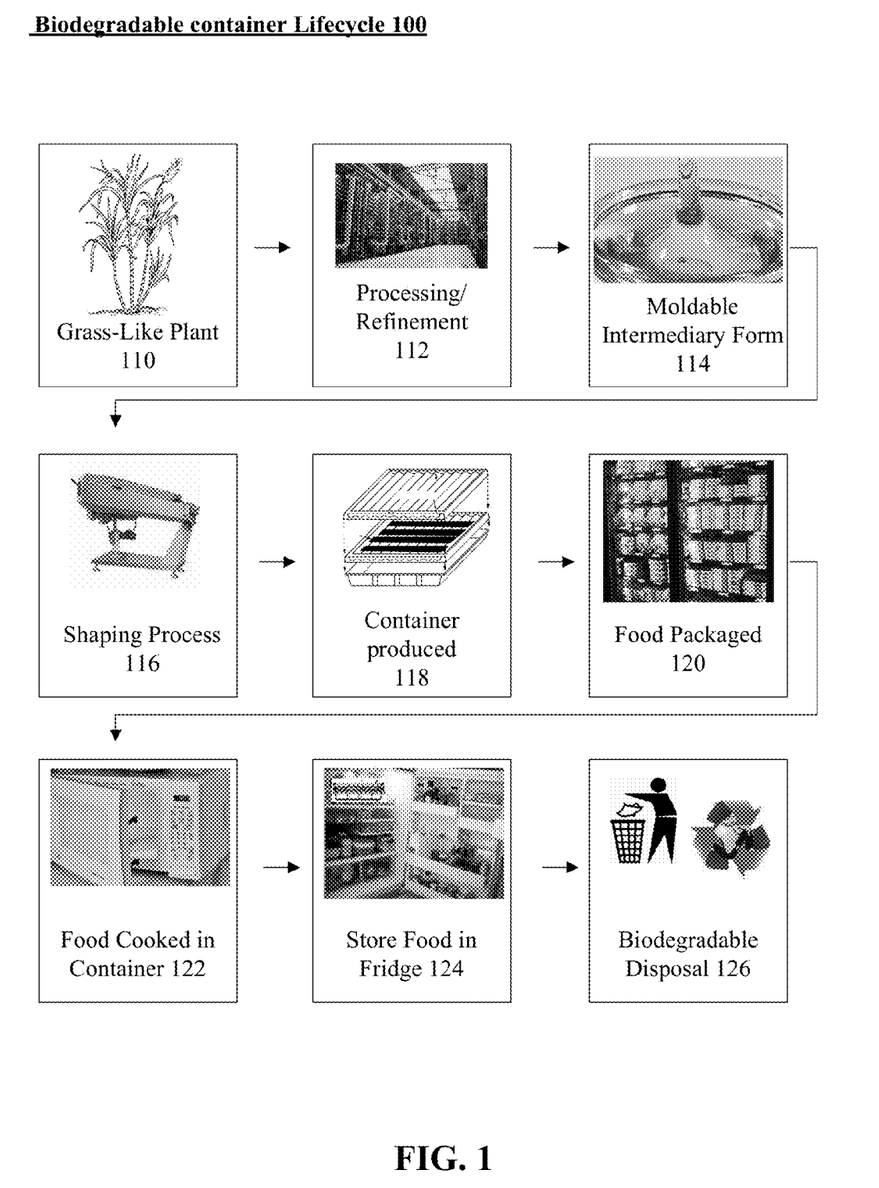
FIG. 1 shows a lifecycle for a biodegradable/microwavable container in accordance with an embodiment of the disclosure.

Turning to FIG. 1, a lifecycle 100 for the biodegradable/microwavable container is shown in accordance with an embodiment of the disclosure. As shown, the manufacturing material for the container is a grass-like plant 110. This grass-like plant 110 undergoes processing/refinement 112 to produce a moldable intermediary form or substance 114. This substance may be modified to add varying chemicals to add strength and to modify its chemical properties. A shaping process 116 then occurs, which shapes the substance into a container, shown as being produced in process step 118. Food may be packaged in this container 120. For example, microwave dinners, such as those sold in grocery stores can utilize the produced container. The container may also be separately sold, such as through a restaurant supply store (for commercial channels) or a department store (for consumer channels). The packaged food can be cooked (122), such as in a microwave. The container may also be suitable for other cooking apparatuses, such as a convection oven, a toaster over, and the like. The container can be directly stored in a refrigerator/freezer, as shown by step 124. Ultimately (after one or more use—the container may be reused in some embodiments), the container can be disposed, as shown by step 126. Unlike plastics, the grass-based container is completely biodegradable. Thus, it breaks down back into soil, which is able to be used to fertilize future growth of grass-like plants (step 110). Not every step of the shown lifecycle 110 is necessary in all embodiments, and process/lifecycle derivatives and alternatives are contemplated.

In embodiments of the disclosure, the grass-like plant can be a Monocotylendon, such as a plant classified in the Poales order. One of ordinary skill can readily discern that the specifics for the lifecycle process vary based on the type of grass-like plant 110 selected and the purpose of the container produced (118).

The choice of the grass-like plant to form the biodegradable container may be based, at least in part in one embodiment, upon a taste enhancement resulting from its use. That is, some choices of grass-like plant may result in a pleasing smell or flavor. One such plant (Sugarcane, which is a plant of the *Saccharum* genus), for example, can add an additional "sweetness" to meats when fatty meats are microwaved on a surface formed from a sugar cane based material.

For illustrative purposes, the disclosure shall briefly detail the lifecycle 110 for a *Saccharum* genus (e.g., Sugarcane) Monocotylendon. As processing/molding processes for other Monocotylendon plants are well known, it should be appreciated that the detailed process is not to be construed as limited to *Saccharum* grass-like plants. Further, the process detailed for the *Saccharum* genus is only one available process, and others can be utilized—as is known by one of ordinary skill. For example, bulrush plants (Monocotylendon plant of the Poales order) can be utilized in some contemplated embodiments. Other types of grass-like plants 110 and combinations having a substance formed at least in part from one or more grass-like plants 110 are contemplated herein for forming the microwavable container (118).

In a use-case for *Saccharum* genus, the processing/refinement (112) process for Sugarcane can be a two-stage one. In the first stage, mills extract raw sugar from freshly harvested cane, and sometimes bleach it to make "mill white" sugar for local consumption. Refineries, often located nearer to consumers, then produce refined white sugar, which is 99 percent sucrose. The milling and refining processes are sometimes combined.

In the milling stage, the *Saccharum* is crushed in a series of large roller mills to extract a liquid. This liquid is carried away for use in boilers or a diffuser. The juice (initially dirty with impurities) is often combined with lime, causing impurities to settle. The resulting liquid is often thickened into a syrup by boiling off water using steam in an evaporation process. The syrup is placed in a large pan for boiling to create sugar crystals.

In the refining state, an affination process is used to process raw sugar. The raw sugar is mixed with a warm concentrated syrup of slightly higher purity than the syrup layer (so that it will not dissolve the crystals). The resulting magma is centrifuged to separate the crystals from the syrup, thus removing the greater part of the impurities. Carbonation then occurs, where the liquor is processed to remove solids to make the liquor turbid. In other words, the sugar solution may be clarified by an addition of phosphoric acid and calcium hydroxide (a phosphatation technique). Alternative techniques (such as carbonatation) may be used. A resulting liquid can be filtered for remaining solids, such as by using an active carbon filtration method. An optional de-colorization process may then occur. It some embodiments, it may be desirable to replace this step with an intentional "colorization process" depending on the desired color of the container produced (in step 118).

Processed sugarcane produces sucrose, which is the moldable intermediary form of step 114. Numerous techniques and machines exist for spinning, pulling, blowing, splitting, and shaping sugar, which may be utilized in the shaping process 116. Thus, the shaping process 116 for created a container from sucrose is well known in the art and is possible through many techniques, all of which are to be considered within scope of the disclosure. For example, U.S. Pat. No. 1,869,005 (titled "Sugar Molding Machine"), U.S. Pat. No. 4,273,793 (titled "Apparatus and Process for the Preparation of Gasified Confectioneries by Pressurized Injection Molding"), U.S. Pat. No. 2,157,467 (titled "Machine for Molding and Embossing Sweets"), U.S. Patent Publication 2004/0234660 (titled "Process for Compression Molding a Dried Aerated Confection"), European Patent Publication EP2279668 (titled "Candy Molding Machine"), European Patent Number EP0039106 (titled "Machine for the Manufacture of Sugar-Candy and Mould for Such a Machine"), European Patent Publication EP1306012 (titled "Process and Apparatus for Shaping a Boiled Candy Body in a Mold"), and the like.

Figure 2:
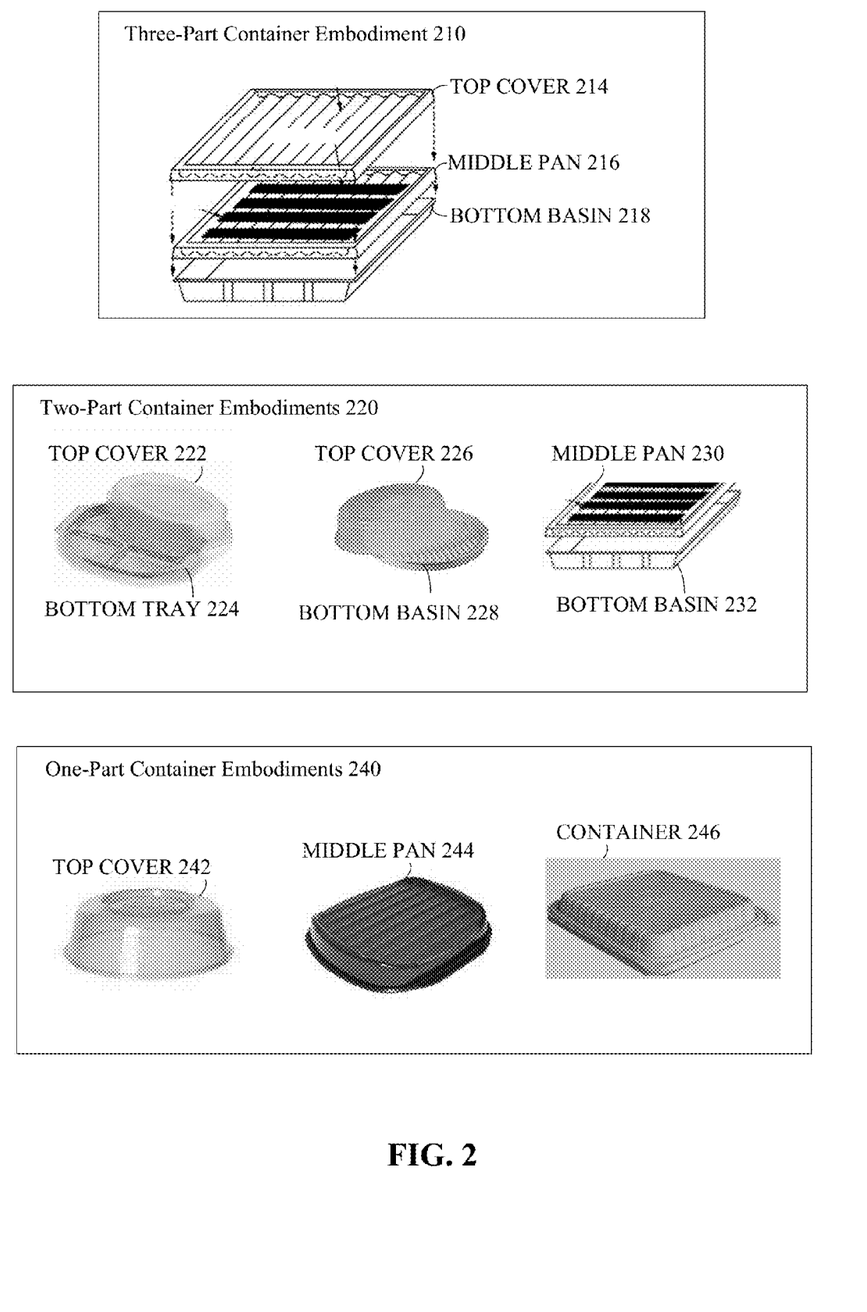
FIG. 2 shows embodiments for a biodegradable container in accordance with the disclosure.

FIG. 2 shows embodiments for a biodegradable container in accordance with the disclosure. The biodegradable container is able to be of one or more parts. Specific embodiments show three-part containers (210), two-part containers (220), and one part containers (240). Four or more piece/part containers are also contemplated.

In multi-part containers, different parts are able to be made from different materials. For example, one part of the container may be formed from a *Saccharum* grass (e.g., Sugarcane), while a different part can be formed by a *Bolboschoenus* genus (Bulrush grass) grass, while yet another part can be formed from a *Cyperus* genus grass. In one contemplated embodiment, one or more of the components of a multipart container, may be formed from a highly-reusable plastic (even if it is not biodegradable), where components meant to be often disposed of can be formed from a biodegradable grass-like plant.

Embodiment 210 shows a three part container, which includes a top cover 214, a middle pan 216, and a bottom basin 218. These pieces can be designed to be closely coupled to one another. A series of holes may be included in the middle pan 216, so that when fatty meats are microwaved, liquid residue can fall through the pan 216 to accumulate in the bottom basin 218. In one embodiment, a steaming liquid (intended to hydrate food) may be included in the bottom basin 218, which is heated separate from food placed on the middle pan 216. In such an embodiment, the middle pan 216 may have holes to allow the steam to rise or may not have holes. In embodiments where steaming occurs, the top cover may or may not include vent holes, to either release or contain pressure from steam during cooking.

The three-part container 210 can permit each of the three parts (top cover 214, middle pan 216, and bottom basin 218) to be separated, for food placement, storage, liquid disposal (from the bottom basin 218), and cleaning. In one embodiment, the middle pan 216 can include a series of "grills" designed to improve a cooking of fatty meats in a microwave.

Embodiment 220 shows a series of different two-part configurations for the biodegradable container. The two parts can include a top cover 222 and a bottom tray 224, for example. The bottom tray 224 may have separations to keep different types of food isolated from each other. IN another embodiment for a top cover 226 and a bottom basin 228, the bottom basin 228 can be designed (e.g., grilled) to cook a fatty meat. In one embodiment, the bottom basin 228 may be formed to have holes and a hollow interior, so that liquids from cooking meat can be captured and redirected during the cooking process. A middle pan 230 and a bottom basin 320 two-piece container are also contemplated. Such an embodiment may suggest use of a commercially available splash guard (not part of the container) and/or use of a paper-towel over a cooked fatty meat to prevent intra-microwave splatter during cooking.

One part container embodiments 240 are also shown. A one piece embodiment of a top cover 242 (made from a biodegradable, microwavable grass-like substance) is contemplated. This cover 242 can be designed for single use or to be reused multiple times. A middle pan 244 embodiment is contemplated, where a pan for cooking fatty meats (such as bacon) is sold separately. This pan 244 may have included holes, and may be designed to be used with existing microwavable containers. For example, a "standard size" microwavable container can be placed underneath the middle pan 244 and used as a catch basin in one embodiment. Similarly, a microwavable container (without a middle pan) can be made from a biodegradable grass-like plant as detailed herein. Other contemplated containers may include a top and a bottom, but be one-piece container, as shown in diagram 246. The container material itself can be flexible and sealable, so food is able to be placed in an interior pocket for heating in a microwave or other cooking apparatus.

The following figures elaborate on three-part container embodiment 210. One of ordinary skill should realize that one, two, and four and more part containers can include specifics detailed hereafter—which are to be considered within the scope of the disclosure.

Referring now to FIGS. 3A, 3B, 4A, 4B, 5A, 5B, 6A, 6B, 7A, 7B, 8A, 8B, 9A, and 9B, a microwavable food article cooker 10 according to various aspects of the present invention provides numerous benefits, notably a simple construction, manufactured from a biodegradable material such as bulrush. The cooker may include a top cover 300 that sits loosely atop a middle pan 400. By reference to FIGS. 4B, 7B, 5B, and 8B, the cover 300 and the pan 400 are together held in place by gravity, mated at the surface formed by the top cover pocket 301 and the middle pan lip 401.

Figure 6A:
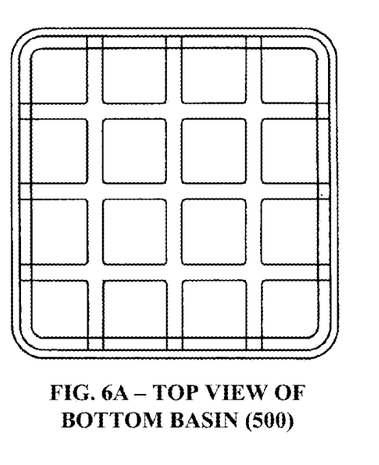
FIGS. 6A and 6B are a top view and side view, respectively, of a bottom basin of a cooking apparatus in accordance with an embodiment of the present disclosure.
Figure 6B:
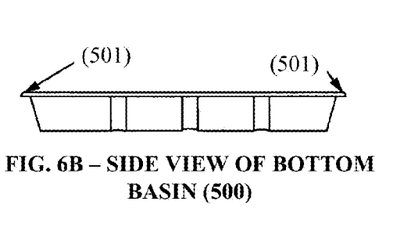
Figure 7A:
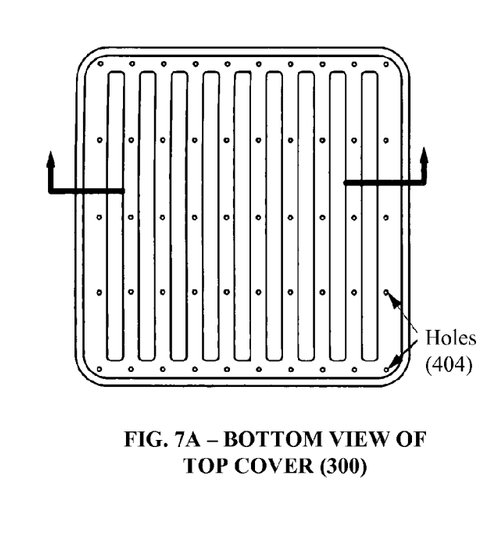
FIGS. 7A and 7B are a bottom view and section thru view, respectively, of a top cover of a cooking apparatus in accordance with an embodiment of the present disclosure.
Figure 7B:
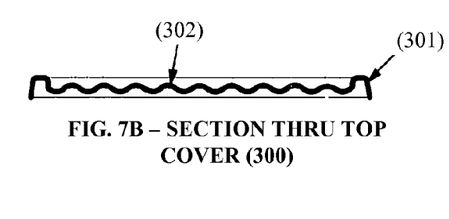
Figure 8A:
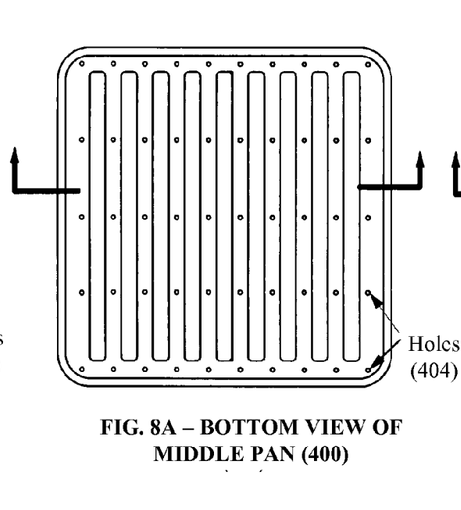
FIGS. 8A and 8B are a bottom view and section thru view, respectively, of a middle pan of a cooking apparatus in accordance with an embodiment of the present disclosure.
Figure 8B:
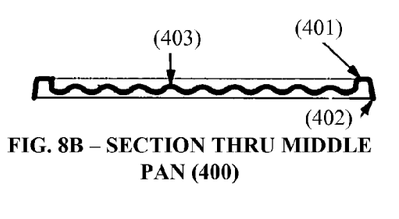
Figure 9A:
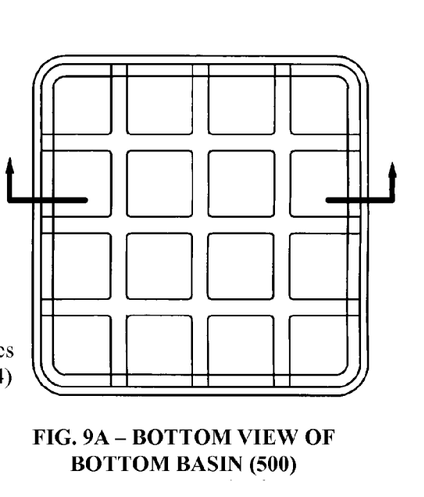
FIGS. 9A and 9B are a bottom view and section thru view, respectively, of a bottom basin of a cooking apparatus in accordance with an embodiment of the present disclosure.
Figure 9B:
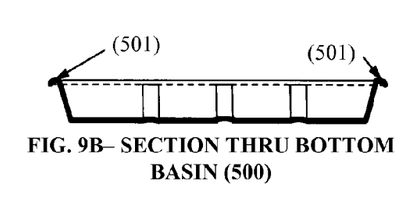

Now including reference to FIGS. 6B and 9B, the middle pan 400 incorporates a pocketed portion 402 and, together or separately with the cover 300, securely attaches to the bottom catch basin 500 by mating (e.g., snap on) of the middle pan pocketed portion 402 with the catch basin lip 501. The aforementioned attachment means may be as generally described in U.S. Pat. No. 4,574,974 (herein incorporated by reference) or other commonly known snap-on designs familiar to those skilled in the art.

Alternatively, the aforementioned mating surfaces may be formed by transposing pocketed portions and lipped features, such that, for example, the top cover 300 would include a lip and the middle pan 400 a pocket where these two pieces mate. Likewise, the middle pan 400 would include a lip and the bottom catch basin 500 would include a pocket where these two pieces mate.

Figure 3A:
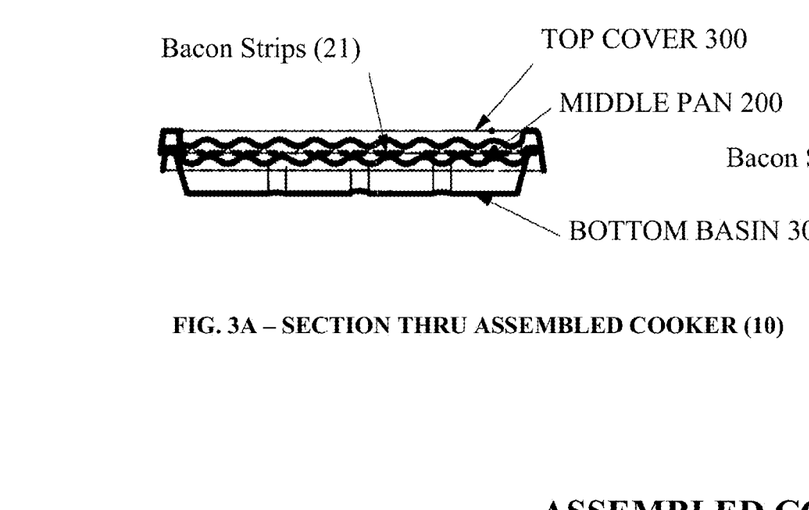
FIG. 3A is a side view of an assembled food article package and cooker in accordance with an embodiment of the present disclosure.
Figure 3B:
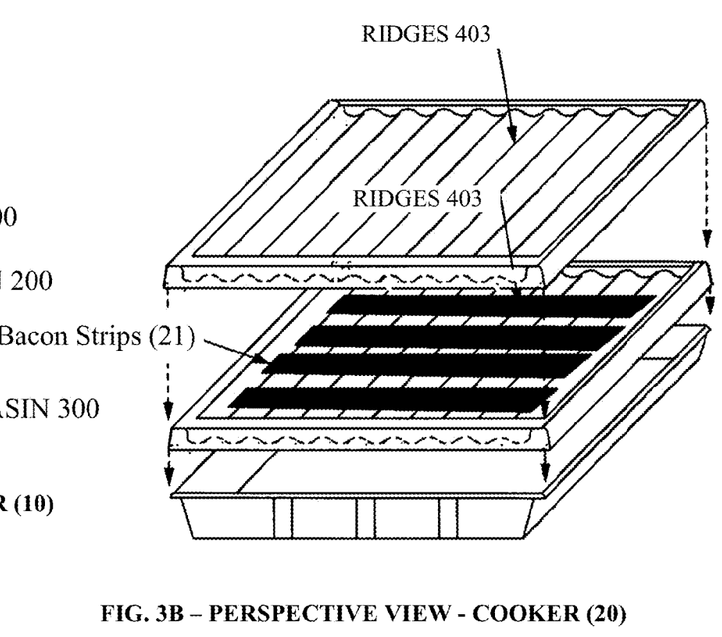
FIG. 3B is a perspective view of an assembled food article package and cooker with bacon strips encased in accordance with an embodiment of the present disclosure.
Figure 4A:
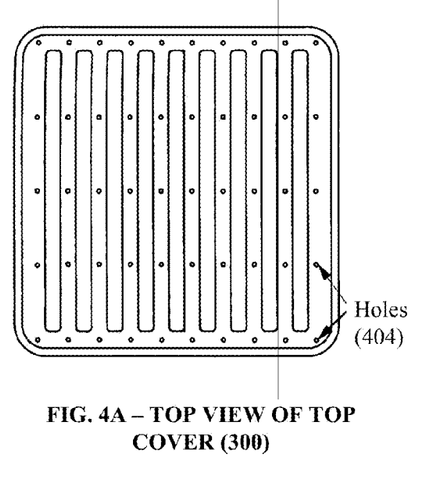
FIGS. 4A and 4B are a top view and side view, respectively, of a top cover of a cooking apparatus in accordance with an embodiment of the present disclosure.
Figure 4B:
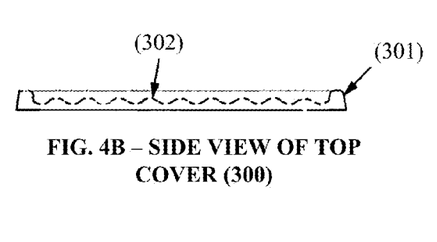
Figure 5A:
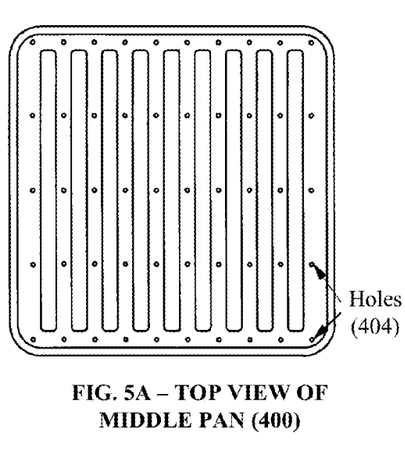
FIGS. 5A and 5B are a top view and side view, respectively, of a middle pan of a cooking apparatus in accordance with an embodiment of the present disclosure.
Figure 5B:
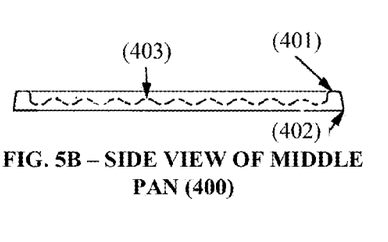

In one embodiment, foods, such as bacon strips 21, may be prepackaged in a microwavable food article cooker 20 by manufacturers of food and meat products. To prevent curling and twisting during cooking, bacon may, at the time of packaging, be positioned generally perpendicularly between the top cover which is comprised of a plurality of cover ridges 302 and the middle pan, itself comprised of a plurality of pan ridges 403. The cover ridges 302 and pan ridges 403 may be cusped or rounded to any suitable radius at their respective apexes to prevent bacon, sausages, hotdogs, and the like from sticking to the surface of the top cover and middle pan, respectively.

While cooking, bacon will also splatter and produce grease. The top cover 300 prevents bacon splatter from hitting the inside oven walls or other surfaces (as bacon continues to cook after being removed from the microwave oven). The top cover also directs splatter downward by gravity through a plurality of thru holes 404 in the middle pan. This simple feature allows grease or other liquids from bacon, or other foods being cooked to flow down into the catch basin 500, thereby enhancing the palatability of the cooked food.

Hot grease or other liquids expelled from bacon or other foods flows downward through the holes 404 and is collected in the bottom catch basin 300 allowing for safer handling and reduced risk of being burned. The middle pan 400 being securely attached to the catch basin 500 contains the hot grease and liquid thereby assuring safer handling. The grease being contained by the middle pan and catch basin assembly may be disposed of as garbage. In another preferred embodiment, the microwavable cooking apparatus 100 is made of Bulrush, a bio-degradable material, allowing for eco-friendly disposal of the used cooker.

In one embodiment, the microwavable cooking apparatus 10 may be utilized for cooking other food types such as seafood, fowl, vegetables, beef, tofu or rice and other foods that can be cooked or steamed in a microwave unit. In such instances, the food article may be placed in the catch basin 500 along with liquid and covered with the middle pan 400 (with or without the top cover 300). Alternatively, the food article may be placed on the middle pan 400 and steamed by liquid held in the catch basin 500. At the preference of the food preparer, the top cover 300 may or may not be used in such instances.

It is indeed contemplated that the microwavable cooking apparatus 10 may be distributed or sold unpackaged, i.e., without food included. All pieces of the cooker, including the top cover 300, middle pan 400, and catch basin 500 may be distributed individually or sold separately in any shape or size to accommodate variations of the microwave cooking apparatus 10, including, overall volume, catch basin depth, top cover height, middle pan area, or any other variable dimension.

No one embodiment disclosed herein is essential to the practice of another unless indicated as such. Indeed, the invention, as supported by the disclosure above and in the originally filed claims, includes all systems and methods that can be practiced from all suitable combinations of the various aspects disclosed, and all suitable combinations of the exemplary elements listed. Such combinations have particular advantages, including advantages not specifically recited herein.

Alterations and permutations of the preferred embodiments will become apparent to those skilled in the art upon a reading of the specification and a study of the drawings.

Accordingly, none of the disclosure of the preferred embodiments defines or constrains the invention. Rather, the issued claims variously define the invention. Each variation of the invention is limited only by the recited limitations of its respective claim, and equivalents thereof, without limitation by other terms not present in the claim. For example, claims that do not call for any exact number of elements in a plurality are not limited to any specific configuration or number.

In addition, aspects of the invention are particularly pointed out below using terminology that the inventor regards as having its broadest reasonable interpretation. The words "comprising," "including," and "having" are intended as open-ended terminology, with the same meaning as if the phrase "at least" were appended after each instance thereof. A clause using the term "whereby" merely states the result of the limitations in any claim in which it may appear and does not set forth an additional limitation therein. The conjunction "or" between alternative elements means "and/or," and thus does not imply that the elements are mutually exclusive unless context or a specific statement indicates otherwise. It is understood that the description herein is intended to be illustrative only and is not intended to be limitative. Rather, the scope of the invention described herein is limited only by the claims appended hereto.

This disclosure may be embodied in other forms without departing from the spirit or essential attributes thereof. Accordingly, reference should be made to the following claims, rather than to the foregoing specification, as indicating the scope of the disclosure.

What is claimed is:

1. A microwavable container comprising:
  a top cover having a plurality of ridges on a bottom surface of the top cover and a pocket disposed on the bottom surface of the top cover, said pocket being positioned proximate to a periphery of the top cover;
  a middle pan comprising one or more holes;
  a bottom basin, wherein the top cover, the middle pan, and the bottom basin are biodegradable being formed from a processed and shaped Monocotylendon plant of the Poales order, wherein the top cover fits on top of the middle pan, wherein the middle pan fits on top of the bottom basin, wherein the middle pan is designed so that fatty meats are positioned on top of the middle pan and below the top cover during microwave operations for cooking the fatty meats, wherein during microwave operations, the top cover prevents spatter from the fatty meats being cooked from gathering on an interior of a microwave, wherein during microwave operations, the bottom basin catches liquid residue from the fatty meats begin cooked, said liquid residue dripping through the one or more holes of the middle pan.

2. The microwave container of claim 1, wherein the Monocotylendon plant of the Poales order is a plant having the *Saccharum* genus.

3. The microwave container of claim 1, wherein the Monocotylendon plant of the Poales order is a bulrush plant.

4. The microwave container of claim 1, said middle pan having a plurality of ridges on the top surface of said pan, said ridges facilitating cooking of the fatty meats utilizing grease from the fatty meats being at least partially captured within the lower regions of the ridges during microwave operations.

5. The microwave container of claim 1, said middle pan comprising a lip disposed on a top surface of the middle pan, said lip being positioned proximate to a periphery of the middle pan, said middle pan comprising a pocket disposed on a bottom surface of the middle pan, said pocket being positioned proximate to the periphery of the middle pan.

6. The microwave container of claim 1, the bottom basin having a lip disposed on a top surface of the bottom basin, said lip being positioned proximate to the periphery of the bottom basin.

7. A microwavable container comprising:
  a top cover having a plurality of ridges on a bottom surface of the top cover and a pocket disposed on a bottom surface of the top cover, the pocket being positioned proximate to a periphery of the top cover;
  a middle pan comprising one or more holes;
  a bottom basin, wherein the top cover fits on top of the middle pan, which fits on top of the bottom basin, wherein the middle pan is designed so that fatty meats are positioned on top of the middle pan and below the top cover during microwave operations for cooking the fatty meats, wherein during microwave operations, the top cover prevents spatter from the fatty meats being cooked from gathering on an interior of a microwave, wherein during microwave operations, the bottom basin catches liquid residue from the fatty meats begin cooked, said liquid residue dripping through the one or more holes of the middle pan.

8. The microwave container of claim 7, said middle pan having a plurality of ridges on the top surface of said middle pan, said ridges facilitating cooking of the fatty meats utilizing grease from the fatty meats being at least partially captured within lower regions of the ridges during microwave operations.

9. The microwave container of claim 7, said middle pan comprising a lip disposed on a top surface of the middle pan, said lip being positioned proximate to a periphery of the middle pan, said middle pan comprising a pocket disposed on a bottom surface of the middle pan, said pocket being positioned proximate to the periphery of the middle pan.

10. The microwave container of claim 7, the bottom basin having a lip disposed on a top surface of the bottom basin, said lip being positioned proximate to a periphery of the bottom basin.

11. The microwave container of claim 7, wherein the top cover, the middle pan, and the bottom basin are formed from a biodegradable material.

12. A microwavable container comprising:
  a top cover;
  a middle pan comprising one or more holes, said middle pan further comprising a lip disposed on a top surface of the middle pan, said lip being positioned proximate to a periphery of the middle pan, said middle pan comprising a pocket disposed on a bottom surface of the middle pan, said pocket being positioned proximate to the periphery of the middle pan;
  a bottom basin, wherein the top cover, the middle pan, and the bottom basin are biodegradable being formed from a processed and shaped Monocotylendon plant of the Poales order, wherein the top cover fits on top of the middle pan, wherein the middle pan fits on top of the bottom basin, wherein the middle pan is designed so that fatty meats are positioned on top of the middle pan and below the top cover during microwave operations for cooking the fatty meats, wherein during microwave operations, the top cover prevents spatter from the fatty meats being cooked from gathering on an interior of a microwave, wherein during microwave operations, the bottom basin catches liquid residue from the fatty meats begin cooked, said liquid residue dripping through the one or more holes of the middle pan.

13. The microwave container of claim 12, wherein the Monocotylendon plant of the Poales order is a plant having the *Saccharum* genus.

14. The microwave container of claim 12, wherein the Monocotylendon plant of the Poales order is a bulrush plant.

15. The microwave container of claim 12, said middle pan having a plurality of ridges on the top surface of said pan, said ridges facilitating cooking of the fatty meats utilizing grease from the fatty meats being at least partially captured within the lower regions of the ridges during microwave operations.

16. The microwave container of claim 12, the top cover having a plurality of ridges on a bottom surface of the top cover and a pocket disposed on the bottom surface of the top cover, the pocket being positioned proximate to a periphery of the top cover.

17. The microwave container of claim 12, the bottom basin having a lip disposed on a top surface of the bottom basin, said lip being positioned proximate to the periphery of the bottom basin.

18. A microwavable container comprising:

a top cover;

a middle pan comprising one or more holes, the middle pan further comprising a lip disposed on a top surface of the middle pan, the lip being positioned proximate to a periphery of the middle pan, the middle pan comprising a pocket disposed on a bottom surface of the middle pan, the pocket being positioned proximate to a periphery of the middle pan;

a bottom basin, wherein the top cover fits on top of the middle pan, which fits on top of the bottom basin, wherein the middle pan is designed so that fatty meats are positioned on top of the middle pan and below the top cover during microwave operations for cooking the fatty meats, wherein during microwave operations, the top cover prevents spatter from the fatty meats being cooked from gathering on an interior of a microwave, wherein during microwave operations, the bottom basin catches liquid residue from the fatty meats begin cooked, said liquid residue dripping through the one or more holes of the middle pan.

19. The microwave container of claim 18, said middle pan having a plurality of ridges on the top surface of said middle pan, said ridges facilitating cooking of the fatty meats utilizing grease from the fatty meats being at least partially captured within lower regions of the ridges during microwave operations.

20. The microwave container of claim 18, the top cover having a plurality of ridges on a bottom surface of the top cover and a pocket disposed on the bottom surface of the top cover, the pocket being positioned proximate to a periphery of the top cover.

21. The microwave container of claim 18, the bottom basin having a lip disposed on a top surface of the bottom basin, said lip being positioned proximate to a periphery of the bottom basin.

22. The microwave container of claim 18, wherein the top cover, the middle pan, and the bottom basin are formed from a biodegradable material.

* * * * *